United States Patent [19]

Hershey

[11] 4,329,877
[45] May 18, 1982

[54] ADJUSTABLE OVERLOAD MECHANISM FOR A DIFFERENTIAL PRESSURE TRANSMITTER

[75] Inventor: George E. Hershey, Ardsley, Pa.
[73] Assignee: Honeywell Inc., Minneapolis, Minn.
[21] Appl. No.: 165,116
[22] Filed: Jul. 1, 1980
[51] Int. Cl.³ .............................................. G01L 7/08
[52] U.S. Cl. ......................................... 73/706; 73/716
[58] Field of Search ........................ 73/706, 716, 722; 92/133

[56] References Cited

U.S. PATENT DOCUMENTS

| | | | |
|---|---|---|---|
| 2,872,813 | 2/1959 | Lovelace | 73/720 |
| 3,492,872 | 2/1970 | Caspar et al. | 73/722 |
| 3,751,988 | 8/1973 | Reese | 92/37 |
| 3,910,106 | 10/1975 | Brady | 73/726 |
| 3,950,996 | 4/1976 | Lewis | 73/720 |
| 4,072,058 | 2/1978 | Whitehead, Jr. | 73/706 |
| 4,169,390 | 10/1979 | Schultz et al. | 74/2 |
| 4,173,149 | 11/1979 | Critten et al. | 73/706 |
| 4,285,244 | 8/1981 | Green | 73/706 |

Primary Examiner—Donald O. Woodiel
Attorney, Agent, or Firm—Laurence J. Marhoefer; Lockwood D. Burton; Mitchell J. Halista

[57] ABSTRACT

An adjustable overload mechanism for a differential fluid pressure transmitter includes a first and a second overload control diaphragm and an adjustable spring pressure means for applying an adjustable preload pressure to the control diaphragms. The spring pressure means for each diaphragm includes a spring such as a Belleville washer spring located between a diaphragm back-up plate in contact with a side of the control diaphragm and a wedge shaped support for the Belleville washer spring. A wedge shaped drive means is arranged to be selectively movable with respect to the wedge shaped spring support while maintaining the sloping wedge surfaces in contact. An adjustable drive screw is connected to the drive wedge to provide a means for changing the relative position of the support wedge and drive wedge. The relative motion between the two wedge shaped elements displaces the support wedge transversely to the Belleville washer to change the height of the Belleville washer which affects the preload or spring pressure against the control diaphragm. Each control diaphragm is used to control the valving of a fill fluid in contact with a respective barrier diaphragm subjected to an input fluid pressure. The fill fluid is pressurized by the movement of the barrier diaphragm and transmits the input pressure to a pressure sensor. An excessive or overload input pressure overcomes the preload or spring pressure biasing the control diaphragm to divert the fill fluid displaced by the barrier diaphragm to protect the sensor from the overload pressure.

18 Claims, 1 Drawing Figure

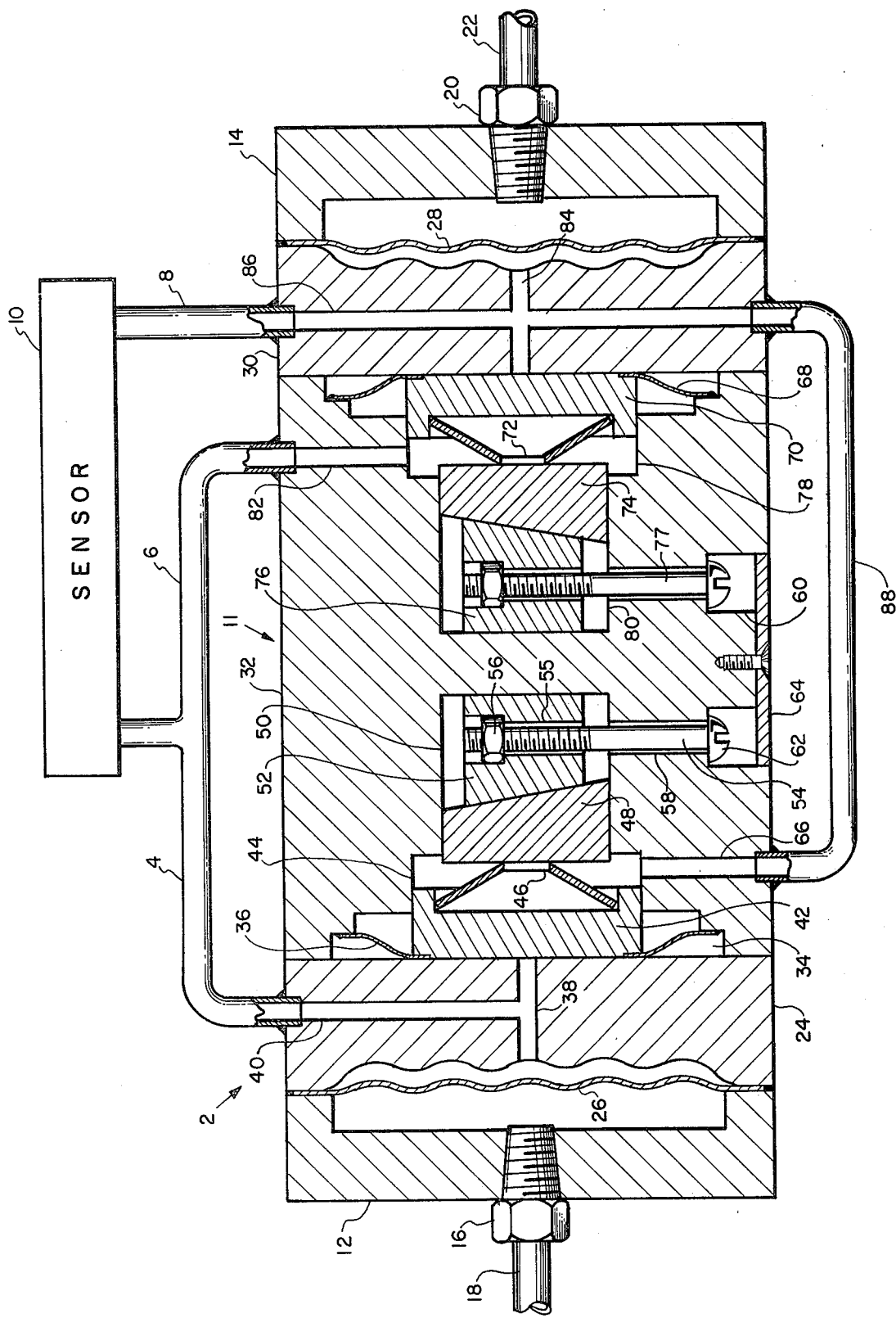

ADJUSTABLE OVERLOAD MECHANISM FOR A DIFFERENTIAL PRESSURE TRANSMITTER

BACKGROUND OF THE INVENTION

1. Field of the Invention

The present invention relates to pressure to electrical signal transmitters. More specifically, the present invention is directed to an overload protection mechanism for a differential pressure transmitter.

2. Description of the Prior Art

Differential pressure transmitters for producing an electrical signal of a value dependent upon the difference between two fluid pressures are well-known in the art. This type of transmitter usually employs a barrier diaphragm between an input process fluid and a fill fluid contained within the transmitter body. The barrier diaphragm transmits the pressure of the input fluid to the fill fluid which, in turn, transmits fluid pressure to a pressure sensor. An example of such a transmitter employing a pressure sensor which has only a relatively small displacement over its operating range is shown in the Whitehead, Jr. U.S. Pat. No. 4,072,058. In this transmitter, the pressure sensor is a semiconductor strain-sensitive wafer. Differential pressure transducers of the form shown in the aforesaid patent include a so-called head, or transmitter body, structure which contains two barrier diaphragms. A chamber on one side of one barrier diaphragm is pressurized with a first input fluid having a first pressure and a chamber on one side of the other barrier diaphragm is pressurized with a second input fluid having a second pressure. These two input fluids may be so-called process fluids which can be obtained from process flow lines, e.g., from respective sides of an orifice plate. A separate chamber on the other side of each of the barrier diaphragms contains a corresponding fill fluid. These fill fluids communicate through fluid passages with opposite sides of the pressure sensor, and the latter is displaced by an amount which is dependent upon the difference between the two pressures of the fill fluids, i.e., upon the differential pressure of the two applied input fluids. The sensor produces an electrical output signal which is dependent upon the displacement and, hence, upon the differential pressure.

Because of the minute full range displacement of the sensor in such transmitters, it has been necessary to provide such transmitters with overload protection arrangements to protect the sensor from being excessively displaced and, hence, either damaged or destroyed by excessive applied input fluid pressures. In the aforesaid U.S. patent, such an overload protection is provided for each barrier diaphragm by a corresponding circular spring which is arranged to preload a respective control diaphragm. The control diaphragms are each arranged to valve or divert a respective fill fluid into an expansion chamber to relieve the excess pressure on the sensor. An applied pressure which is in excess of the preload pressure is effective to move the control diaphragm whereby the excessive input pressure is diverted from the sensor. Ultimately, the diversion of the fill fluid allows the barrier diaphragm to bottom onto a back-up plate to prevent any further input pressure increase from being applied to the sensor. However, it has been found that in order to change the working range of the pressure transmitter, the springs used to preload the control diaphragms must be changed to produce a new working range for the overload protection. Such characterization of the preload springs involves a disassembly and reassembly of the transmitter structure which is an inefficient and expensive operation.

SUMMARY OF THE INVENTION

Accordingly, it is an object of the present invention to provide an improved differential pressure transmitter which has an adjustable overload protection mechanism.

In accomplishing this and other objects, there has been provided, in accordance with the present invention an adjustable overload protection mechanism for a differential pressure transmitter having a means for adjusting the preload pressure on a control diaphragm within a transmitter body. At the preload pressure, the control diaphragm is used to selectively divert a transmitter fill fluid contained between the control diaphragm and a barrier diaphragm exposed to a pressurized input fluid. The preload pressure adjusting means includes a spring in contact with the control diaphragm and a pair of wedge-shaped members located between the spring and a fixed support with the sloping sides of the wedge members in contact. A wedge drive means selectively slides one of the wedge members on the other wedge member to deflect the spring to a desired height.

BRIEF DESCRIPTION OF THE DRAWING

A better understanding of the present invention may be had when the following detailed description is read in connection with the accompanying drawing, in which the single FIGURE is a pictorial illustration of a cross-section of a fluid pressure transmitter embodying an example of the present invention.

DETAILED DESCRIPTION OF THE PREFERRED EMBODIMENT

Referring to the single FIGURE drawing in more detail, there is shown a differential pressure to current transmitter 2 coupled by fluid carrying tubes 4, 6 and 8 to a remote sensor capsule 10. The fluid pressure transmitter 2 includes a transmitter housing or body 11, a first end cap 12 and a second end cap 14 located at respective opposite ends of the body 11. The first end cap 12 includes a first fluid inlet fitting 16 connecting a first fluid inlet pipe 18 to the interior of the cap 12. Similarly, the second end cap 14 includes a second fluid inlet fitting 20 connecting a second fluid inlet pipe 22 of the interior of the second end cap 14. The first end cap 12 is arranged to cover a first back-up plate 24 and to capture a barrier diaphragm 26 between the end cap 12 and the back-up plate 24 along the peripheral edge of the barrier diaphragm 26. Similarly, the second end cap 14 is arranged to capture a second barrier diaphragm 28 along its peripheral edge against a second back-up plate 30. The transmitter body 11 is located between the first back-up plate 24 and the second back-up plate 30 and is arranged to house the fluid pressure overload protection mechanism therein.

A first annular recess 34 is provided in one end of the transmitter body 11 adjacent to the side of the back-up plate 24 opposite to the side facing the first barrier diaphragm 26. A first control diaphragm 36 is located across this annular space 34 and has its peripheral edge attached to the transmitter body 11 by any suitable means, e.g., welding. A first fluid passage 38 is provided within the first back-up plate 24 to connect the two faces of the back-up plate 24, and a second fluid passage 40 is provided within the first back-up plate 24 between the first fluid passage 38 and a side of the back-up plate 24. A first support plate 42 is provided within the annular space 34 to coaxially support the control diaphragm 36 against the face of the back-up plate 24 across one end of the first fluid passage 38. The support plate 42 is arranged to be movably guided in a second annular recess 44 within the transmitter body 32 coaxial with the first recess 34.

A Belleville spring washer 46 is located within the annular recess 44 between the bottom face of the support plate 42 and a flat side face of a support wedge 48 located in a well 50 coaxial with the second annular recess 44. A drive wedge 52 is located in the well 50 and has a sloping side in contact with a sloping side of the support wedge 48. A drive screw 54 is coaxially located in a transverse hole 55 through the drive wedge 52 with a drive nut 56 captured in the hole 55 while mounted on the drive screw 54 and having its outer peripheral edge bearing on the shoulders of a counterbore coaxial with the hole 55 through the drive wedge 52. One end of the drive screw 54 extends out of the drive wedge 52 and through a hole 58 in a side of the well 50 the transmitter body 11 to a counterbore 60 coaxial with the hole 58 at a side of the transmitter body 11. A screw head 62 on the aforesaid end of the drive screw 54 has its outer peripheral edge bearing on the shoulders of the counterbore 60. A filler plug 64 is located in the counterbore 60 to provide a fluid-tight seal of the counterbore 60 at the outer face of the transmitter body 11. A third fluid passage 66 is located within the transmitter body 11 and is arranged to connect the second annular recess 44 with a side of the transmitter body 11.

The second back-up plate 30 has associated with it a second control diaphragm 68, a second diaphragm support plate 70, a second Belleville washer 72, a second support wedge 74 and a second drive wedge 76 in a manner similar to that described above for their counterparts associated with the first back-up plate 24. A screw and nut combination 77 is associated with the second drive wedge 76 to provide a selective bidirectional positioning of the second drive wedge 76 in a manner similar to that described above for the first drive wedge 52. A third annular recess 78, the transmitter body 11 is arranged to house a second Belleville washer 72 and the second diaphragm support plate 70 while a second well 80 coaxial with the third recess 78 is arranged to house the second support wedge 74 and the second drive wedge 76 in a manner similar to that described above for the first well 50, the first support wedge 48 and the first drive wedge 52. A fourth fluid passage 82 is provided between the third annular recess 78 and the fluid pipe 6 attached to a side of the transmitter body 32. A fourth fluid passage 84 is arranged to connect the faces of the second support or back-up plate 30 while a fifth fluid passage 86 connects the fluid passage 84 to the fluid pipe 8 and another side of the back-up plate 30. A fluid pipe 88 is provided to connect the fluid passage 66 with the fluid passage 86.

DESCRIPTION OF OPERATION

In operation, the pressure transmitter shown in the single FIGURE drawing is effective to apply the input fluid pressure from the inlet pipes 18 and 22 to the respective barrier diaphragms 26 and 28. The barrier diaphragms 26 and 28, in turn, apply the pressure to the corresponding fill fluid located between the barrier diaphragm 26 and 28 and the control diaphragms 36 and 68, respectively, as well as applying the pressure through the fluid conduits 38, 40, 82, 84, and 86 and fluid pipes 4, 6, and 8 to the sensor 10. Upon the attainment of an excessive input process pressure in either fluid conduit 18 or fluid conduit 22, the overload mechanism in the transmitter 2 is used to absorb this excess pressure and to divert it from the sensor 10. Specifically, the Belleville springs 46 and 72 which preload the control diaphragms 36 and 68, respectively, are overcome by the input pressure. The input pressure is then effective by means of the fill fluid to move the corresponding pair of the control diaphragms 36 and 68 and the diaphragm support plates 42 and 70 against the pressure of the respective one of the Belleville washers 46 and 72. Such a movement increases the volume available for the fill fluid which is displaced thereto from beneath the barrier diaphragm by the excess input pressure. Ultimately, the barrier diaphragm on the excess pressure side bottoms against the corresponding back-up plate to the fluid passage in the back-up plate to isolate the sensor 10 from the excess pressure of the input fluid.

In order to provide an adjustment of the spring pressure used to define the overload threshold, the support wedges 48, 74 and the drive wedges 52, 76 shown in the drawing are moved relative to each other to change the height of the Belleville washer whereby its spring pressure is altered. For example, the first Belleville washer 46 is preset by the first drive wedge 52 and a first support wedge 48 by a rotation of the screw head 62 which drives the drive wedge 52 by changing the position of the nut 56 on the drive screw 54. The sloping face of the drive wedge 52 is accordingly selectively positioned on the sloping face of the support wedge 48 which movement alters the deflection of the Belleville washer 46 against the diaphragm support 42. This positioning of the support wedge 48 changes the deflection height of the Belleville washer 46 which alters the threshold pressure controlled by the first control diaphragm 36. Similarly, the threshold control pressure of the second control diaphragm 68 is preset by the relative movement of the second support wedge 74 and second drive wedge 76 which alters the height of the second Belleville spring 72.

It should be noted that while a Belleville washer has been shown as the spring means for preloading the control diaphragm, the present invention is equally usable with the circular spring shown in the aforesaid U.S. Pat. No. 4,072,058 patent. Further, for purposes of simplifying the illustration in the single FIGURE drawing, conventional fill fluid injection means and transmitter assembly means for maintaining the layered transmitter structure such as nuts and bolts have been omitted, such devices being well-known in the art. Finally, while a captured nut has been shown to enable a corresponding screw to induce a bidirectional motion of the associated drive wedge, it should be noted that other drive arrangements can be used, e.g., the hole in the drive wedge could be threaded.

Accordingly, it may be seen that there has been provided, in accordance with the present invention, an improved adjustable overload pressure protection mechanism for a differential pressure transmitter.

The embodiments of the invention in which an exclusive property or privilege is claimed are as follows:

1. A fluid pressure responsive device comprising a housing means, a first chamber in said housing means arranged to be connected to a source of fluid pressure, a second chamber in said housing means, a movable diaphragm in said housing means separating said first and second chambers, and adjustable means in said second chamber for biasing said diaphragm to minimize the volume in said first chamber, wherein said adjustable means includes a spring means in contact with said diaphragm, a fixed wall attached to said housing means and an adjustable separator means between said wall and said spring means for selectively establishing the spacing of said spring means from said wall, wherein said spring means includes a Belleville washer.

2. A fluid pressure responsive device as set forth in claim 1 wherein said separator means includes a first wedge block having a sloping side and a second wedge block having a sloping side, said wedge blocks having their sloping sides in contact and drive means for selectively altering the position of said first block on said second block.

3. A fluid pressure responsive device as set forth in claim 2 wherein said drive means includes a drive screw, a nut engaging said screw and bearing against said second wedge block and a screw head on said drive screw and bearing against said housing.

4. A fluid pressure responsive device as set forth in claim 1 and further including a fluid pressure sensor and a fluid conduit connecting said sensor to said first chamber.

5. A fluid pressure responsive device comprising a housing means, a first chamber in said housing arranged to be connected to a source of fluid pressure, a second chamber in said housing, a first movable diaphragm in said housing separating said first and second chambers, a third chamber in said housing, fluid passage means for connecting said second and said third chambers, a fourth chamber in said housing, a second movable diaphragm in said housing separating said third and fourth chambers, and adjustable means in said fourth chamber for biasing said second diaphragm to minimize the volume in said third chamber and to close said fluid passage means by said second diaphragm.

6. A fluid pressure responsive device as set forth in claim 5 wherein said adjustable means includes a spring means in contact with said diaphragm, a fixed wall attached to said housing and an adjustable separator means between said wall and said spring means for selectively establishing the spacing of said spring means from said wall.

7. A fluid pressure responsive device as set forth in claim 6 wherein said spring means includes a Belleville washer.

8. A fluid pressure responsive device as set forth in claim 7 wherein said separator means includes a first wedge block having a sloping side and a second wedge block having a sloping side, said wedge blocks having their sloping sides in contact and drive means for selectively altering the position of said first block on said second block.

9. A fluid pressure responsive device as set forth in claim 8 wherein said drive means includes a drive screw, a nut engaging said screw and bearing against said second wedge block and a screw head on said drive screw and bearing against said housing.

10. A fluid pressure responsive device as set forth in claim 5 and further including a fluid pressure sensor and a fluid conduit connecting said sensor to said third chamber.

11. A fluid differential pressure responsive transmitter comprising a housing means, a first chamber in said housing arranged to be connected to a source of fluid pressure, a second chamber in said housing, a first movable diaphragm in said housing separating said first and second chambers, a third chamber in said housing, fluid passage means for connecting said second and said third chambers, a fourth chamber, a second movable diaphragm in said housing separating said third and fourth chambers, a first adjustable means in said fourth chamber for biasing said second diaphragm to minimize the volume in said third chamber and to close said fluid passage means, a fifth chamber in said housing arranged to be connected to a source of a second fluid pressure, a sixth chamber in said housing, a third movable diaphragm in said housing separating said fifth and sixth chambers, a seventh chamber in said housing, a second fluid passage means for connecting said sixth and seventh chambers, an eighth chamber, a fourth movable diaphragm in said housing separating said seventh and eighth chambers, a second adjustable means in said eighth chamber for biasing said fourth diaphragm to minimize the volume in said third chamber and to close said second fluid passage means, a differential fluid pressure sensor having a first input and a second input, a first fluid conduit connecting said first input to said third chamber and a second fluid conduit connecting said second input to said sixth chamber.

12. A fluid differential pressure responsive transmitter as set forth in claim 11 wherein said first and second adjustable means each include a spring means in contact with a corresponding one of said second and fourth diaphragms, a fixed wall attached to said housing and an adjustable separator means between said wall and said spring means for selectively establishing the spacing of said spring means from said wall.

13. A fluid differential pressure responsive transmitter as set forth in claim 12 wherein said spring means in said first and second pressure means includes a Belleville washer.

14. A fluid differential pressure responsive transmitter as set forth in claim 13 wherein said separator means in said first and second pressure means includes a first wedge block having a sloping side and a second wedge block having a sloping side, said wedge blocks having their sloping sides in contact and drive means for selectively altering the position of said first block on said second block.

15. A fluid differential pressure responsive transmitter as set forth in claim 14 wherein said drive means in said first and second adjustable means includes a drive screw, a nut engaging said screw and bearing against said second wedge block and a screw head on said drive screw and bearing against said housing.

16. A fluid differential pressure transmitter as set forth in claim 13 wherein said pressure sensor is arranged to convert a difference in fluid pressures at said first and second inputs to a representative electrical signal.

17. A fluid differential pressure transmitter as set forth in claim 11 and further including a third fluid conduit connecting said third chamber to said eighth chamber and a fourth fluid conduit connecting said fourth chamber to said sixth chamber.

18. A fluid differential pressure transmitter as set forth in claim 17 wherein said first diaphragm has a position providing a seal for said first fluid passage means and said third diaphragm has a position providing a seal for said second fluid passage means.

* * * * *